May 27, 1958  A. UHLIG ET AL  2,836,354
DIFFERENTIAL ACTUATING MECHANISM
Filed Oct. 27, 1953  9 Sheets-Sheet 1

INVENTORS
Arno Uhlig and
Warner Uhlig
by: Michael S. Striker

Fig. 3

May 27, 1958    A. UHLIG ET AL    2,836,354
DIFFERENTIAL ACTUATING MECHANISM
Filed Oct. 27, 1953    9 Sheets-Sheet 3

Fig. 4

INVENTORS
Arno Uhlig and
Werner Uhlig
By: Michael S. Striker
             age.

United States Patent Office 2,836,354
Patented May 27, 1958

2,836,354

DIFFERENTIAL ACTUATING MECHANISM

Arno Uhlig and Werner Uhlig, Oberndorf (Neckar), Germany

Application October 27, 1953, Serial No. 388,497

Claims priority, application Germany November 3, 1952

8 Claims. (Cl. 235—60)

The present invention relates to calculating machines of all types and in particular to those calculating machines which are capable of adding, subtracting, multiplying, and dividing.

More particularly, the present invention relates to structure for transferring digits set into various organs of such a machine from a given set of organs to a different set of organs.

The best known structures for accomplishing this result (see e. g. U. S. Patent No. 2,667,307) take the form of digit transferring systems which are turnable about a given axis, but it is invariably necessary to shift this axis in order to carry out all the desired functions of the calculating machine, and this shifting of the turning axis of the known digit transferring systems provides a great disadvantage because the structure for shifting this axis is exceedingly complicated and expensive. For example, the members of such known calculating machines whose positions correspond to particular digits cannot cooperate directly with the digit transferring members. They must cooperate with such members through intermediate levers, and thus the known structures are quite elaborate. Furthermore, these known structures require a considerable amount of space.

One of the objects of the present invention is to overcome the above drawbacks by providing a digit transfering structure which is capable of turning about a predetermined stationary axis so that the above mentioned shifting of this axis is entirely eliminated.

A further object of the present invention is to provide a structure of the above type with members having positions corresponding to particular digits, these members cooperating directly with and being in constant operating engagement with digit transferring members.

Another object of the present invention is to provide a digit transferring system which is of an exceedingly simple construction and which is very reliable in operation.

An additional object of the present invention is to provide a digit transferring system which is capable of easily transferring a set of numbers from one mechanism of a calculating machine into another mechanism of the calculating machine.

With the above objects in view, the present invention mainly consists of a calculating machine which includes a stationary pivot means having a predetermined stationary axis. A plurality of digit transferring members are connected to the pivot means for movement with respect thereto to positions respectively located at different radial distances from the stationary axis corresponding to particular digits. A plurality of reversible moving means are operatively connected to the digit transferring members, respectively, to be moved thereby and for moving the same to positions corresponding to particular digits. A releasable lock means is operatively connected to the digit transferring members for locking the same in the respective positions thereof. A drive means is connected to the digit transferring members for turning the latter about the stationary axis through a predetermined angle so that these digit transferring members describe arcs having lengths respectively corresponding to particular digits and so that the plurality of moving means are moved by the digit transferring members through distances respectively corresponding to particular digits. A means is provided for connecting organs of the calculating machine to the plurality of moving means during operation of the drive means so that the moving means transfer the particular digits to organs of the calculating machine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
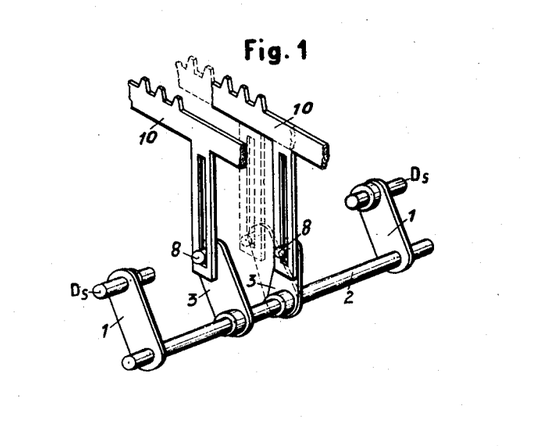
Fig. 1 is a fragmentary schematic illustration of the digit transferring system of the invention in its starting position, two digit transferring members having positions corresponding to two different digits being shown in Fig. 1.
Figure 2:
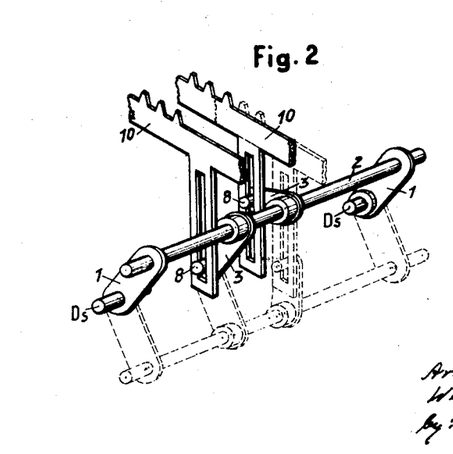
Fig. 2 is a view of the structure of Fig. 1 after the digit transferring members have been turned through a predetermined angle.

Referring now to the drawings and more particularly to Figs. 1 and 2, which diagrammatically illustrate part of the structure of the invention, it will be seen that the structure of the invention includes a pair of pivots located along the axis Ds, these pivots being stationary as by being fixed at opposite sides of the machine on the frame thereof. A pair of links 1 are respectively mounted for turning movement on these pivots so that the links 1 are turnable about the stationary axis Ds, and the links 1 carry a pivot bar 2 which is parallel to the axis Ds and which forms together with the links 1 a bail turnable about this axis. Digit transferring levers 3 are denominationally distributed along the length of pivot bar 2 and are turnable about this bar. These digit transferring levers 3 have digit transferring members 8 fixedly mounted thereon and respectively located in cutouts of reversible moving members 10, as shown schematically in Figs. 1 and 2.

In the rest position of the apparatus the links 1 are in the position shown in Fig. 1. The members 8 are located along the axis $Ds$ when they are in a position corresponding to a zero digit. The reversible moving members 10, which are mounted for free reciprocating movement along their length, are adapted to turn the levers 3 so as to locate members 8 at radial distances from the axis $Ds$ which correspond and are proportional to particular digits. Thus, the left member 8 of Fig. 1 is located along axis $Ds$ and is in a position corresponding to the digit 0. The right moving member 10 has been moved from the dotted to the solid line position shown in Fig. 1 to locate the member 8 at a position corresponding to a particular digit greater than zero.

If the levers 3 are locked in the position shown in Fig. 1 and the links 1 are turned through a predetermined angle, such as that shown between the dotted and solid line indications of links 1 in Fig. 2, it is apparent that the left reversible moving member 10 of Figs. 1 and 2 will not move at all since the member 8 associated with this moving member is located on the axis $Ds$, and the right moving member 10 will on the other hand move through a distance proportional to the radial distance of the right member 8 from the axis $Ds$. In other words, the greater the radial distance of a member 8 from the axis $Ds$ the greater will be the arc described by this member upon turning of links 1 through a predetermined angle so that the moving members 10 will also be moved through greater or smaller distances depending upon the positions of the members 8 respectively associated therewith. Thus, with the structure of the invention it is possible to first move the members 10 to locate the members 8 at radial distances from axis $Ds$ which are directly proportional to particular digits and then the members 8 are moved about the axis $Ds$ through a predetermined angle to impart to the members 10 movements whose magnitudes correspond and are directly proportional to the particular digits. The members 10 may be in the form of racks and may be moved through given distances by any organs of the calculating machines to locate the members 8 at positions corresponding to particular digits, and then different organs may be connected to the members 10 so that upon movement of the latter during turning of the links 1 (with the levers 3 locked on bar 2 at the angular positions to which levers 3 were originally moved by members 10) the digits set into the machine from the first set of organs will be transferred into the second set of organs.

Figure 3:
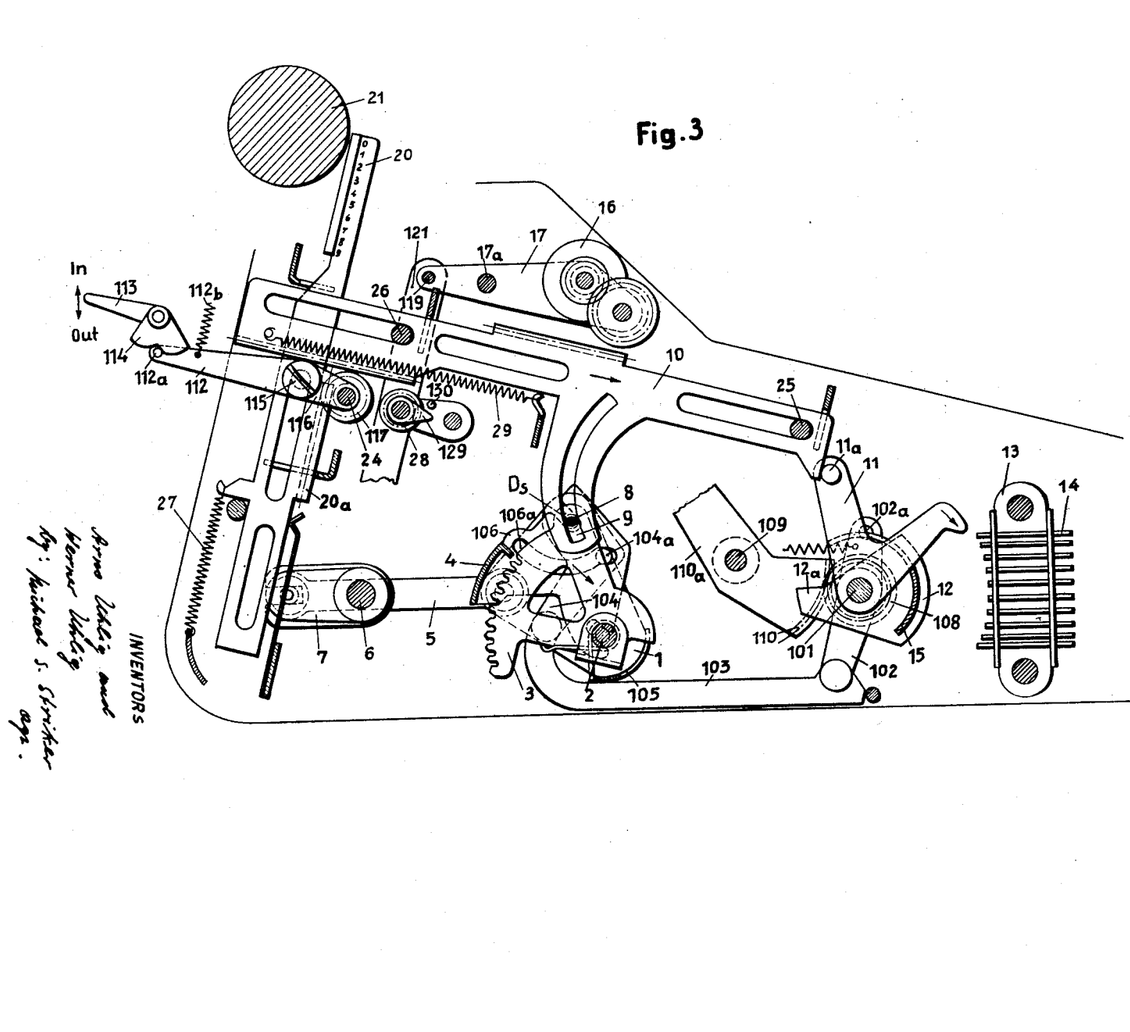
Fig. 3 is a partly fragmentary, partly sectional view of a calculating machine showing the structure of the invention in its zero or starting position, all non-essential parts being omitted from Fig. 3.
Figure 4:
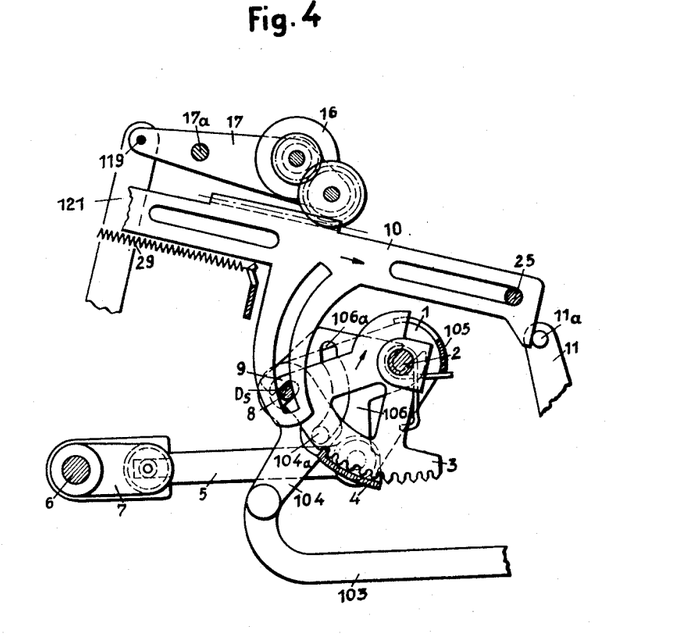
Fig. 4 is a fragmentary view of part of the structure of Fig. 3, Fig. 4 showing the position of the parts after the drive shaft has turned through half a revolution and showing how a zero value is transferred to the calculating mechanism of the machine.

A particular structure for carrying out the principle of the invention, shown by Figs. 1 and 2 and described above, is illustrated in Figs. 3–10. Referring to Fig. 3, which shows the structure of the invention in its rest or starting position, it will be seen that the links 1 are mounted for free turning movement about the axis $Ds$ and are interconnected by the member 105 which has the form of a curved plate fixedly attached at opposite ends thereof to the links 1, respectively, as best shown in Fig. 8. The pivot bar 2 is carried by the links 1 for turning movement therewith about the axis $Ds$, and a plurality of the digit transferring levers 3 are arranged in side by side relation on the bar 2 between the links 1 for free turning movement about the bar 2. The length of the bar 2 and the number of levers 3 correspond to the capacity of the machine. The levers 3 are formed in their outer peripheries with teeth and a lock member 4 extends parallel to the axis $Ds$ and is located opposite the teeth of levers 3. After the angular positions of levers 3 have been set, the member 4 is moved into mesh with the teeth of levers 3 to lock these levers 3 in their angular positions with respect to the bar 2, this lock member 4 then turning together with elements 1—3 about the axis $Ds$. The structure for supporting and moving lock member 4 is described below.

The machine is provided with a drive shaft 6 which is rotated by a motor through one or more clutches having nothing to do with the invention and provided for control purposes, these clutches and motor not being shown in the drawings. A crank 7 is fixed to the drive shaft 6 to be rotated thereby and a connecting rod 5 is pivotally connected at one end to the crank 7 and at its opposite end to one of the links 1. The shaft 6 turns at a constant speed so that the crank 7 also turns at a constant speed, and in this way the connecting rod 5 reciprocates the links 1, and all of the members connected thereto for turning movement therewith about axis $Ds$, through a predetermined angle at a harmonic, sinusoidally varying rate. In other words, when the crank 7 starts to turn from the position shown in Fig. 3 the connecting rod 5 turns the links 1 at the lowest rate of speed, and this rate of speed increases until the crank 7 is located at 90° from the position shown in Fig. 3, this speed then decreasing until crank 7 is located at 180° from the position shown in Fig. 3, and the turning speed of links 1 and the parts turning therewith varies in the same way during the second half of each rotation of members 6 and 7. Thus, after a complete rotation of members 6 and 7 all of the parts which turn about axis $Ds$ have been reciprocated back and forth through a predetermined angle.

The digit transferring members 8 are respectively fixed to the levers 3, as was described above, and these members 8 carry members 9 which slidably engage the opposite side edges of the arcuate slots in the reversible moving members 10, respectively, these slots being located in downwardly extending projections of members 10 which overlap the levers 3, respectively. When the digit transferring members 8 are in a position corresponding to a zero value, they are located along the axis $Ds$, as was pointed out above. It will be noted that this axis $Ds$ is never shifted and that the members 8 are permanently in operative engagement with moving members 10.

Figure 5:
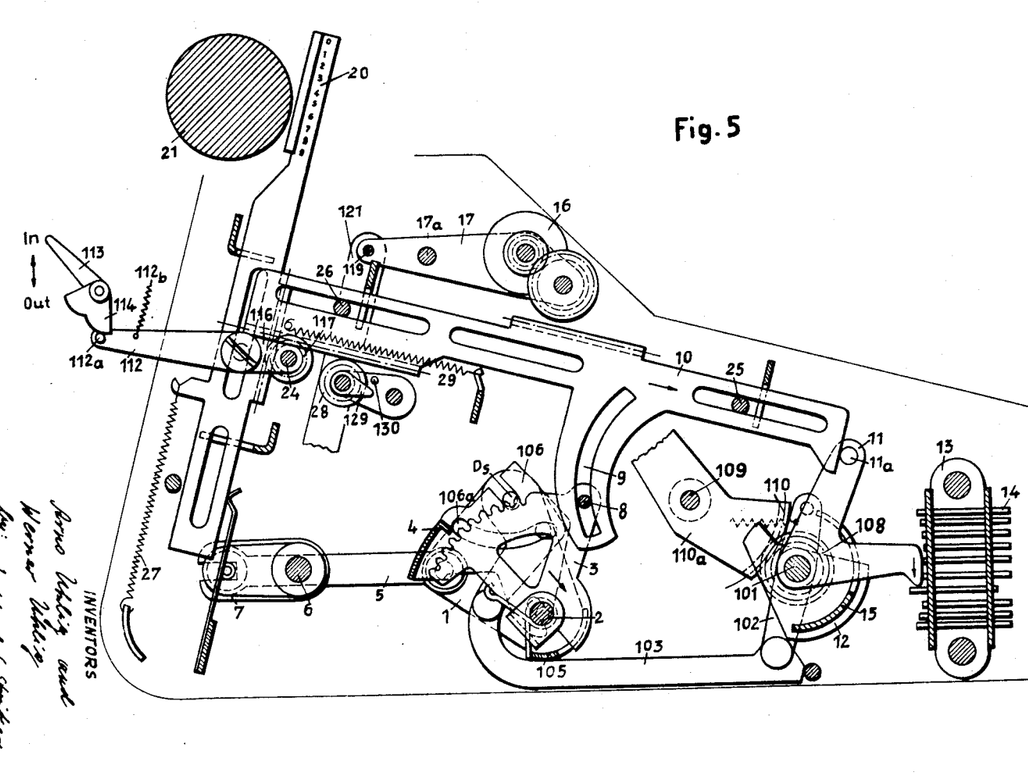
Fig. 5 is a view corresponding to that of Fig. 3 and showing the position of the parts when the digit 6 has been set into the machine.
Figure 6:
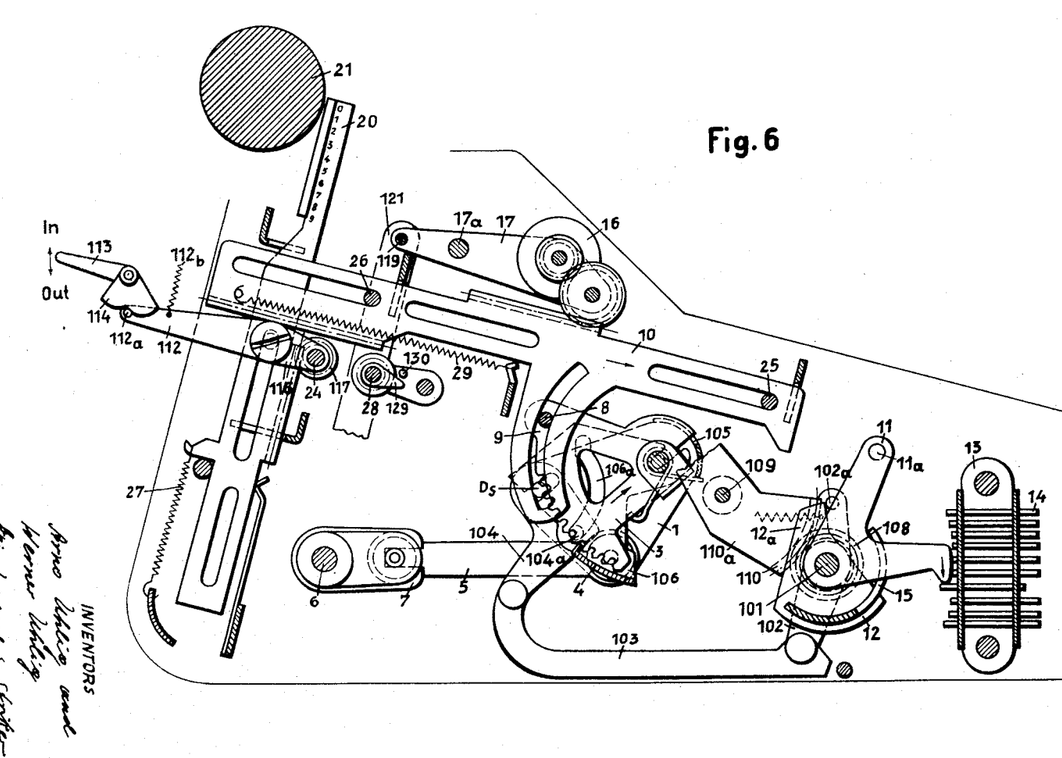
Fig. 6 shows the structure of Fig. 5 after the drive shaft has turned through the first half of a revolution to transfer the value 6 to the calculating mechanism.
Figure 7:
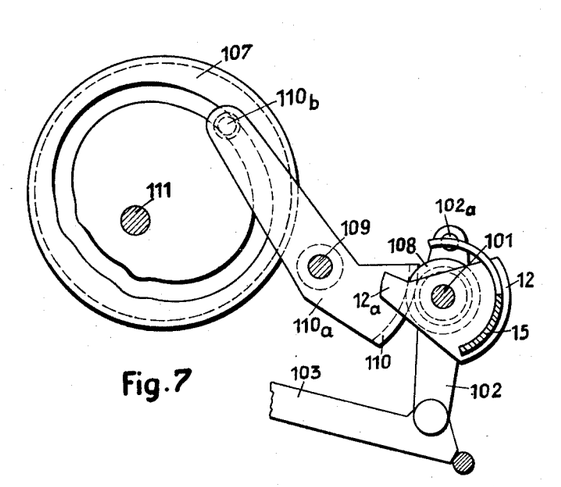
Fig. 7 fragmentarily shows a drive apparatus for operating a control bar of the structure of Figs. 3–6.
Figure 7A:
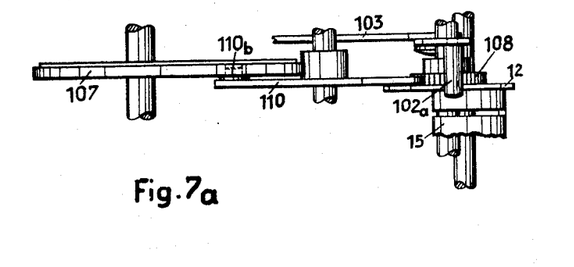
Fig. 7a is a top plan view of the structure of Fig. 7.
Figure 8:
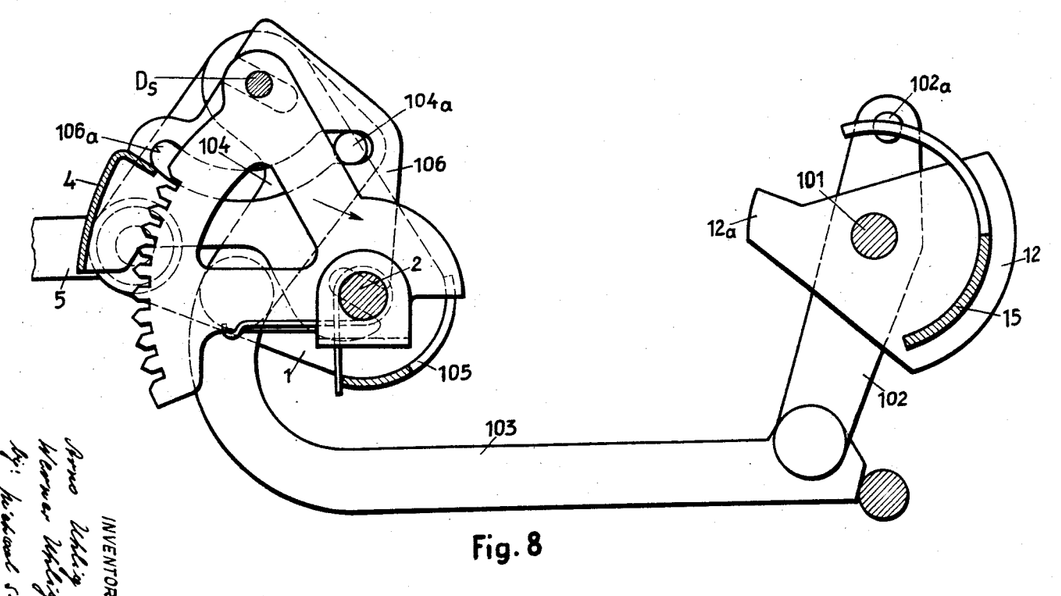
Fig. 8 shows on an enlarged scale a releasable lock means of the invention.

The structure of the invention includes an elongated control member 15 shown in Figs. 3, 5 and 6 and illustrated in particular detail in Figs. 7, 7a, and 8. The machine includes a stationary rod 101 on which a pair of side members 12 are freely turnable, and these side members 12 are interconnected by the control member 15 which extends between the side members 12 and is fixedly attached at opposite ends thereof to these side members. As is shown in Figs. 7 and 7a, a gear 108 is fixed to one of the side members 12 and is turnable about the rod 101, this gear 108 meshing with a gear sector 110 formed on the end of a lever 110a which is turnable about the stationary rod 109, this lever 110a carrying a pin 110b which extends into a cam groove formed in the cam 107 which is eccentrically fixed to the shaft 111. This shaft 111 is rotated, by a structure not shown in the drawings and not forming part of the invention, so that the lever 110a turns about rod 109 to turn gear 108 and in this way turn the control member 15 from the upper position thereof shown in Fig. 3 to a lower position shown in Fig. 6.

Feeler levers 11 are distributed along the rod 101 between side members 12 for free turning movement about the rod 101, and these levers 11 each carry a pin 11a which is adapted to engage an end of one of the moving members 10. The ends of levers 11 opposite from pins 11a thereof are adapted to engage pins 14 of pin carriage 13, these pins 14 corresponding to particular digits and being actuated by the keys of the machine in a manner not forming part of the present invention. The vertical rows of pins 14 correspond to digits 0–9 from the top to the bottom of each row of pins, so that in Fig. 5 the pin 14 corresponding to the digit 6 has been actuated and is engaged by the particular feeler 11 shown in Fig. 5. It will be seen that when the control member 15 turns in counterclockwise direction, as viewed in Fig. 5, the lever 11 of Fig. 5 will be turned in a counterclockwise direction upwardly away from the pin 14 engaging this lever 11 so that the pin 11a engages moving member 10 to move the latter through a linear distance corresponding and proportional to the digit 6, and because of the permanent operative engagement between members 10 and 3 it is apparent that the levers 3 will turn through an arc whose angle corresponds and is proportional to the digit 6.

The turning movement of the members 12 and 15 actuates the structure for shifting lock member 4 into mesh with the teeth of levers 3 to lock these levers 3 in their respective angular positions on pivot bar 2. The control member 15 turns in a clockwise direction to release the feelers 11 for turning movement, also in a clockwise direction, about shaft 101 to engage the pins 14. Springs 29 respectively engage the reversible moving members 10 to move the latter to the right, as viewed in the drawings, so that through the pins 11a the moving members 10 turn the feelers 11 until they engage particular pins 14. The member 15 turns in a clockwise direction through a predetermined angle beyond the feelers 11 after the latter have engaged pins 14, and it is this additional turning of members 12 and 15 which brings about the shifting of lock member 4.

The side members 12 have extensions 12a (Fig. 8) which, during this additional turning of members 12 and 15, engage pins 102a fixed to levers 102 which are turnable on the rod 101 so that these levers 102 are turned in a clockwise direction, as viewed in Fig. 8, and thus the connecting members 103, which are pivotally connected at their right hand ends to the bottoms of levers 102, respectively, are moved to the left, as viewed in the drawings. At their opposite ends the pair of connecting members 103 are pivotally connected to a pair of levers 104 pivotally carried by the stationary pivots located along the axis Ds, and these levers 104 each have a pin 104a fixed thereto. Each pin 104a extends into a curved slot 106a formed in a plate 106 which is formed with opposite notches.

Two such plates 106 are provided at opposite ends of the swinging unit formed by members 1, 2, and 105, and one of the notches of each plate 106 is located about a stationary pivot while the other of the notches is located about the pivot bar 2. The pivot bar 2 is actually formed with opposite grooves in which the parts of each plate 106 defining the lower notch thereof, as viewed in Fig. 8, are slidably located, as is most clearly shown in Fig. 8. Thus, the plates 106 are shiftable in the direction of the arrow shown on these plates in the drawings to move the lock member 4 into its locking position in mesh with the teeth of levers 3, this lock member 4 extending between and being fixed to the opposite plates 106.

The slot 106a of each plate 106 forms part of a circle over the major portion of its length, and this circular arcuate part of the slot 106a has its center located in the axis Ds when the lock member 4 is in its locking position. At its right hand end, as viewed in Fig. 8, the slot 106a is curved differently so that when pin 104a turns in a clockwise direction, as viewed in Fig. 8, the pin 104a will engage plate 106 at the right hand end of notch 106a to shift plate 106 in the direction of the arrow so as to move lock member 4 to its locking position, and in this position the pin 104a is located in the arcuate portion of slot 106a to maintain this arcuate portion of the slot at a distance from the axis Ds which corresponds to the radius of the arcuate portion of slot 106a so that member 4 will be maintained in its locking position while being free to turn with plates 106 and members 1—3 about the axis Ds, the arcuate portion of slot 106a simply moving back and forth along the pin 104a. When the control member 15 is moved upwardly toward its starting position, the levers 102 are free to turn back to their starting position so as to move the pins 104a back to the right hand end of the slots 106a, as viewed in Fig. 8, and the engagement of pins 104a with the right hand ends of slots 106a shifts the plates 106 in a direction opposite from the arrow of Fig. 8 to move the lock member 4 out of its locking position to release levers 3 for turning movement about pivot bar 2. Any suitable springs or the like may be connected to levers 102, for example, to urge these levers back to their starting position where the levers 3 are free to turn on bar 2.

The remaining structure shown in the drawings will be described in connection with the operation of the structure of the invention.

All of the movable parts of the machine are in the position shown in Fig. 3 at the start of the operation of the machine. Assuming that a digit 6 has been placed into the machine so that the pin 14 corresponding to this digit is moved to the position shown in Fig. 5, as was described above, nothing happens until this shaft 111 (Fig. 7) is turned to cause control member 15 to turn in a clockwise direction down toward its lowermost position. Upon such turning of member 15 the several moving members 10 move to the right under the influence of springs 29 respectively connected thereto, these members being supported for free reciprocating movement on stationary rods 25 and 26 which extend through slats of the members 10. This movement of members 10 to the right is transmitted through pins 11a to the several feelers 11 which turn until they engage particular pins 14 so as to prevent further movement of the members 10. Such a position of the parts is shown in Fig. 5. Due to the permanent operative engagement between members 10 and the digit transferring members 8, these latter members are moved to radial distances from the axis Ds corresponding to particular digits, the levers 3 turning, during such movement of members 8, on the bar 2. Thus, in Fig. 5 the member 8 is located at a radial distance from the axis Ds which corresponds to the digit 6. All of the members 8 thus assume positions spaced from the axis Ds by distances corresponding and proportional to particular digits, and, as was mentioned above, the members 8 are located along the axis Ds in their zero position.

Upon additional turning of member 15 beyond feelers 11, the lock member 4 is shifted into its locking position, in the manner described above, so that all of the levers 3 are fixed in their respective angular positions on the bar 2. Thus, upon rotation of drive shaft 6 all of the digit transferring members 8 will be reciprocated through arcs which are directly proportional to the radial distances of members 8 from axis Ds, and thus the reversible moving members 10 will be moved by members 8 through distances respectively proportional to particular digits. In this way numbers set into the pin carriage 13 by the operating keys of the machine may be transferred to other organs by the moving members 10 which are formed with teeth so as to provide racks.

For example, the printing bar 20 will print different numbers on platen 21 depending upon the elevation of the bar 20. A spring 27 urges the bar 20 downwardly to the zero position thereof shown in Fig. 3, and this bar 20 has rack teeth 20a in mesh with a pinion 117 turnably carried by pin 24 supported by a pair of members 116 which are turnable about the stationary pivot 115. One of the members 116 is provided with an extension 112 carrying a pin 112a urged into engagement with the cam 114 by the spring 112b. An operating lever 113 is fixed to the cam 114. If the lever 113 is turned upwardly from the position of Fig. 3 to that of Fig. 5, this lever being turned in this manner by the operator when numbers in the machine are to be printed, the lever 112, 116 will be turned in a counterclockwise direction about pivot 115 so as to move gear 117 into mesh with the lower teeth at the left end of moving member 10 so that upon movement of member 10 to the distance determined by engagement of feeler 11 with a pin 14 the bar 20 will be raised to a position corresponding to the digit set into the machine, this digit being 6 in the position of the parts shown in Fig. 5. The numbers are printed in a known way, and bars 20 return to their zero positions.

At the beginning of the first half of a revolution of shaft 6, the levers 3 having been locked by member 4, the accumulator mechanism 16, 17 is turned into mesh with the upper teeth of the moving members 10. During the further rotation of shaft 6 the parts carried by the stationary pivots located along axis Ds are turned about this axis, the lock member 4 participating in this turning movement, as was described above. (See Fig. 4.) These parts carried by the stationary pivots are reciprocated, for example, through an angle of 90°, so that the members 8 describe arcs having lengths proportional to particular digits so that in this way the members 10 are moved through distances proportional to particular digits and thus transfer into the accumulator mechanism 16, 17 the numbers set into the machine by the keys which actuate the pins 14. All of this takes place during the first half of a revolution of drive shaft 6. At the beginning of the second half of a revolution of drive shaft 6 (Fig. 4), the accumulator mechanism 16, 17 is separated from the moving members 10 so that this accumulator mechanism is operatively connected to the members 10 only while the latter move in one direction, and all of the parts which turn about the axis Ds move back toward their starting position.

Thus, at the end of a single revolution of drive shaft 6 all of the moving members 10 are again located in engagement with pins 11a, the feelers 11 having remained in engagement with the pins 14, and thus all of the moving members 10 are in positions corresponding to the digits set into the pin carriage 13. This operation may be repeated as many times as desired. With the aid of change gears provided in a known way in the accumulator mechanism and with corresponding lateral shifting of the accumulator mechanism in such a way that one or the other of a pair of gears meshes with a particular rack 10, the machine is capable of adding or multiplying, substracting or dividing real values at all times without moving the turning axis Ds of the system, as is required with known machines when complementary values must be transferred to carry out subtraction and division.

Figure 9:
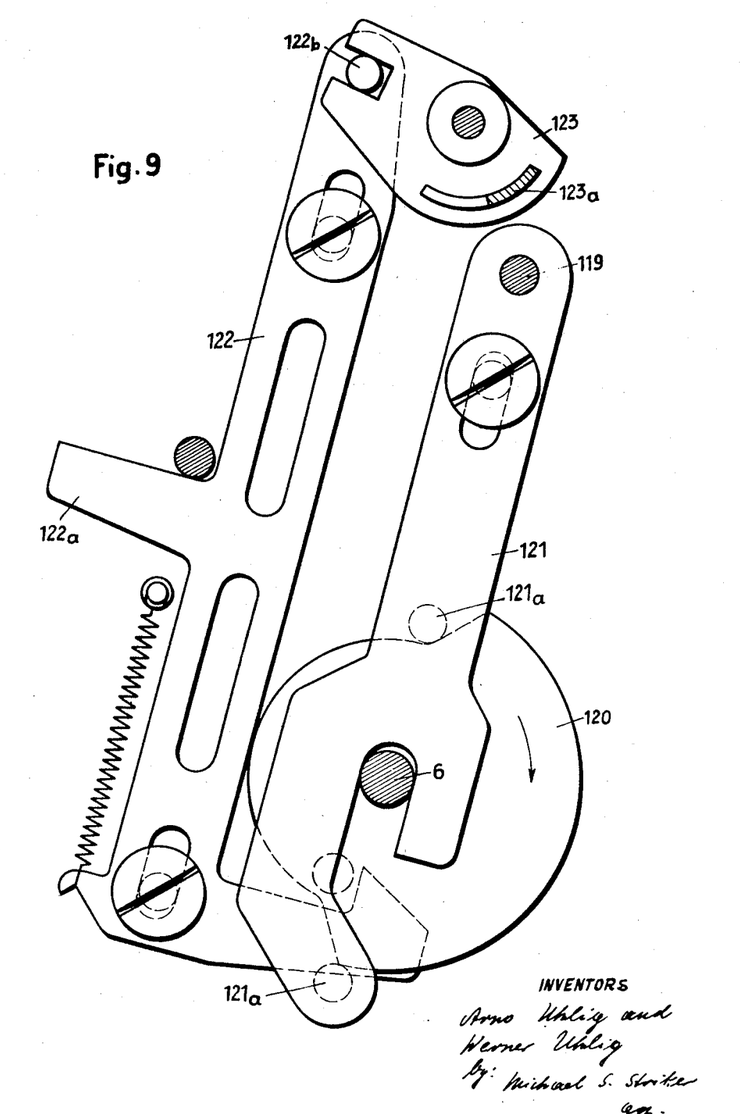
Fig. 9 shows on an enlarged scale structure for moving the calculating mechanism into an out of driving engagement with the digit transferring means of the invention and also shows means for limiting the turning movement of organs of the calculating machine.

The accumulator mechanism 16, 17 can be moved into and out of mesh with moving members 10 by the structure shown in Fig. 9. As is apparent from Fig. 3 upward movement of rod 119 fixed to lever 17 will turn the latter in a clockwise direction about the rod 17a which pivotally supports lever 17 to move the accumulator mechanism 16, 17 into engagement with the moving members 10, while downward movement of rod 119 moves the accumulator mechanism 16 out of mesh with members 10. As is shown in Fig. 9, the raising and lowering of rod 119 is derived from the rotation of shaft 6 which has a cam 120 fixed thereon for rotation therewith. Opposite edge portions of cam 120 are engaged by pins 121a of bar 121 which is fixed to the rod 119. In the position of Fig. 9 the rod 119 is in its lower position and will remain in this lower position while cam 120 turns in a clockwise direction through approximately 180°. Then the cam 120 will raise the pins 121a to raise bar 121 and rod 119 for placing calculating mechanism 16, 17 into mesh with moving members 10.

Figure 10:
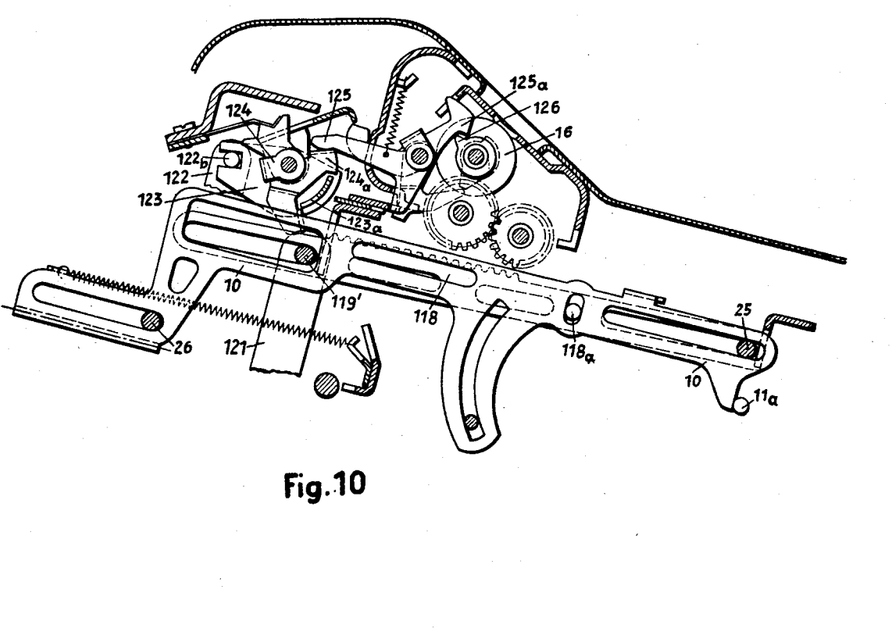
Fig. 10 shows a different embodiment of an apparatus for moving the calculating mechanism to and from a digit receiving position as well as the structure cooperating with the members shown at the top of Fig. 9.

Instead of the arrangement of Fig. 9 for moving the accumulator mechanism into operative engagement with moving members 10, it is possible to use a construction where the movement of accumulator mechanism 16, 17 into and out of mesh with members 10 is carried out by the movement of members 10 themselves, and such an arrangement is shown in Fig. 10. According to the embodiment of Fig. 10, the members 10 themselves have no upper teeth adapted to engage the accumulator mechanism. Instead such teeth are arranged on bars 118 having slots through which the rod 25 extends and through which the rod 119' extends, the members 10 being provided with cutouts which permit vertical movement of rod 119' to the desired extent. A pin 118a fixed to each member 118 is located in a slot of each member 10 so that the members 118 participate in the reciprocating movement of members 10 and are at the same time turnable about rod 25 up and down respectively into and out of mesh with accumulator mechanism 16, 17. The rod 119' is connected to the bar 121 in the manner of rod 119 shown in Fig. 9 and bar 121 is actuated by the structure shown in Fig. 9 and described above so that when bar 121 moves up, rod 119' is raised to also raise the teeth of member 118 into mesh with the accumulator mechanism, while when the bar 121 moves down, rod 119' also moves down to lower the teeth of members 118 out of engagement with the accumulator mechanism.

At the end of each calculating operation the control member 15 is turned back to its upper starting position so that the lock member 4 moves away from the levers 3 to release the latter in the manner described above. The member 15 also raises the feelers 11 to return the moving members 10 to their starting position, and this movement of members 10 to their starting position also moves the levers 3 and members 8 to their starting position where members 8 are located in their zero position along axis Ds. In this way all values set into the structure of the invention are zeroed and new values may be set into the pin carriage 13.

If it is desired to carry out a series of multiplications or divisions which respectively require products or quotients to be carried back into the machine, then in the starting position of the machine parts the mechanism 16, 17, is brought into mesh with the moving members 10 to position the members 3 corresponding to the numbers set in the accumulator mechanism. At the same time a structure described below is operated to prevent the numbered rollers 16 of the accumulator mechanism 16, 17 from turning back through zero. After the machine is set in this manner, the control member 15 is turned to its lower position and the springs 29 move all of the members 10 until the latter are stopped by the fact that the rollers 16 have reached their zero position beyond which they cannot turn. In this way the numbers in the accumulator mechanism are transferred to the moving members 10, which, because of their permanent operative engagement with members 8 turn the latter and members 3 to positions corresponding to the numbers taken out of the accumulator mechanism. The lock member 4 locks the levers 3 in this position and the accumulator mechanism 16, 17 is moved out of engagement with moving members 10 so that the numbers taken out of the accumulator mechanism may be further used in the machine. The numbers taken out of the accumulator mechanism and stored in the levers 3, in this manner, which numbers may, for example, be the result of an addition or subtraction, may, for example, be multiplied by a given number by repeatedly inserting the stored numbers a predetermined number of times into the accumulator mechanism 16, 17. These numbers are transferred from members 3 to the accumulator mechanism through members 10.

Figs. 9 and 10 show structure for preventing the numbered rollers 16 from turning back through their zero positions. As is shown in Fig. 9, a bar 122 is mounted in the machine for reciprocating movement and is urged by a spring to the position shown in Fig. 9. Upon actuation of a key for transferring the numbers in the accumulator mechanism back into the machine, the extension 122a of bar 122 is depressed to move the bar 122 down so that the pin 122b fixed to bar 122 turns the lever 123 which is formed with a notch in which pin 122b is located. The lever 123 carries a member 123a which is moved upwardly in this way and engages, for the duration of this transferring operation, the extension 124a (Fig. 10) of the presetting lever 124 of the tens carrying mechanism, and in this way the lever 125 of the tens carrying mechanism is prevented from moving. Thus, as the single tooth 126 of a gear fixed to numbered roller 16 turns, this tooth eventually engages the end portion 125a of lever 125 when roller 16 is in its zero position, and thus the roller 16 cannot turn back through zero.

If it is desired to print the numbers in the accumulator mechanism, then this same transferring operation is performed while the gears 117 are in mesh with moving members 10 so that the numbers in the accumulator mechanism will be printed by the bars 20 in the manner described above.

Similar operations take place if numbers in the accumulator mechanism 16, 17 (totals, products, quotients) are to be accumulated. Thus, in the starting position of the parts, the accumulator mechanism as well as the storage register 28 are brought into mesh with the upper and lower teeth, respectively, of the moving members 10 (Figs. 3, 5 and 6). The storage register 28 may be turned into mesh with moving members 10 through a mechanism similar to that for moving gears 117 into mesh with the moving members 10. Thus, when the accumulator mechanism 16, 17 turns back to its zero position, it will move the moving members 10 to transmit the numbers in the accumulator mechanism through the moving members 10 to the storage register 28. Printing of the numbers in the accumulator mechanism may be simultaneously carried out if the gears 117 are moved into mesh with moving members 10 in the manner described above. In all cases the numbers in the accumulator mechanism are zeroed and transferred as desired to the printing apparatus, to the storage register, and to the digit transferring members 8 which may thus transfer these numbers to organs of the calculating machine. For example, shaft 6 may be rotated to repeatedly reciprocate members 8 so that numbers taken from the accumulator mechanism can be transferred back to the same a desired number of times.

If it is desired to operate the machine so that the operator may read the value in the storage register, then in the starting position of the machine and in the zero position of the numbered rollers 16 the storage register is brought into mesh with the moving members 10 to transfer the value of the storage register through the moving members 10 to the numbered rollers 16 which are visible through a suitable window, as is apparent from Fig. 10. One tooth gears 129 turn together with the storage register 28 and engage pins 130 when the storage register 28 reaches its zero position so that the storage register cannot turn back through zero, and in this way members 129 and 130 provide a stop means for limiting the movement of members 10 to positions where the members 10 correspond to the numbers in the storage register, and thus these numbers are transferred to the numbered rollers 16.

Of course, operations of this latter type take place while the control member 15 is in its lower position so that the member 15 does not hold the feelers 11 in a position which prevents the movement of the moving members 10. It is apparent that during this same operation, the numbers of the storage register 28 are transferred to the members 8 due to their permanent cooperation with members 10. The member 15 moves to its lower position for all of the operations of the machine, and thus the lock member 4 moves into mesh with the levers 3 to lock the latter in angular positions corresponding to values taken out of the storage register or accumulating mechanisms in the same way that these levers 3 are locked when numbers are taken from the pin carriages 13. Thus, with the structure of the invention it is possible to set into the digit transferring members 8 numbers taken from any organs of the machine such as the accumulating mechanism, the storage register, or the pin carriage, and these numbers will be retained by the lock member 4 so that during operation of the drive shaft 6 the numbers may be transferred to any desired organs of the machine.

The above described details are not all essential to the invention. For example, instead of sinusoidal reciprocation of members 1—3, it is possible to arrange on the rotating drive shaft eccentrics or the like which may be formed with eccentric camming surfaces to provide any desired variable rate of oscillation of members 1—3. The form of the moving members 10 is not limited to that illustrated. These moving members may, for example, be bent to the shape of bell cranks to cooperate with the mechanism of the invention and other organs of a calculating machine of relatively small size.

It will be understood that each of the elements described above, or two or more together, may also find a useful application in other types of calculating machines differing from the types described above.

While the invention has been illustrated and described as embodied in digit transferring systems for calculating machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. In a calculating machine, in combination, a pair of stationary pivots spaced from each other and located along a predetermined stationary axis; a pair of links turnably mounted on said pivots, respectively, for movement about said axis; a pivot bar parallel to said axis and carried by said links to form a bail for movement about said axis; a plurality of digit transferring levers denominationally distributed along said pivot bar and being turnably carried thereby; a plurality of digit transferring members respectively fixed to said levers and being located along said axis when said members are in their zero positions; a plurality of reversible moving means respectively engaging said digit transferring members to be moved thereby and for turning the same about said pivot bar respectively to positions spaced from said axis by radial distances directly proportional to particular digits, respectively; releasable lock means operatively connected to said levers for locking the same and said members therewith in said positions; drive means operatively connected to at least one of said links for turning the latter through a predetermined angle about said axis so that said digit transferring members also turn about said axis to describe arcs having lengths respectively proportional to said particular digits, so that said members move said moving means through distances respectively corresponding to said particular digits; and means for connecting organs of the calculating machine to said plurality of moving means during operation of said drive means so that said moving means transfer said particular digits to said organs.

2. In a calculating machine, in combination, a pair of stationary pivots spaced from each other and located along a predetermined stationary axis; a pair of links turnably mounted on said pivots, respectively, for movement about said axis; a pivot bar parallel to said axis and carried by said links to form a bail for movement about said axis; a plurality of digit transferring levers denominationally distributed along said pivot bar and being turnably carried thereby; a plurality of digit transferring members respectively fixed to said levers and being located along said axis when said members are in their zero positions; a plurality of elongated reversible moving members respectively located over said levers and respectively having projections respectively overlapping said levers and respectively being formed with elongated cutouts in which said digit transferring members are located; support means supporting said moving members for free reciprocating movement in the direction of their length; positioning means engaging said moving members to respectively locate the same in positions respectively corresponding to particular digits so that when said moving members move to said positions said digit transferring members also move therewith through distances corresponding respectively to said particular digits to locate said digit transferring members at positions spaced from said axis by radial distances proportional to said particular digits; releasable lock means operatively connected to said levers for releasably locking the same so as to maintain said digit transferring members respectively in said positions thereof; drive means operatively connected to at least one of said links for turning the latter through a predetermined angle about said axis so that said digit transferring members also turn about said axis to describe arcs having lengths respectively proportional to said particular digits, so that said digit transferring members move said moving members through distances respectively corresponding to particular digits; and means for connecting organs of the calculating machine to said plurality of moving members during operation of said drive means so that said moving members transfer particular digits to said organs.

3. In a calculating machine as defined in claim 2, said elongated cutouts of said moving members being arcuate.

4. In a calculating machine as defined in claim 2, said releasable lock means comprising teeth formed in said digit transferring levers, an elongated lock member located opposite said teeth and being parallel to said axis; a pair of plates carrying said lock member and being mounted on said pivot bar and respectively on said stationary pivots for reversible shifting movement to move said bar into and out of said teeth to respectively lock and release said digit transferring members, said plates and lock member turning together with said pivot bar about said axis during operation of said drive means to maintain said digit transferring members in said positions thereof during operation of said drive means.

5. In a calculating machine as defined in claim 4, said plates each being formed with an elongated slot having a major portion located along a circle whose center is in said axis when said lock member meshes with said teeth and having an end portion extending from said major portion and being curved differently from the same, a pair of levers located adjacent said plates and being turnably mounted on said pivots, respectively, and a pair of pins respectively fixed to said last-mentioned levers and located in said slots so that said pins engage said plates at said end portions of said slots to shift said plates and lock member upon turning movement of said last-mentioned levers about said axis and so that said slots move along said pins during turning of said digit transferring members when said lock bar is in its locking position.

6. In a calculating machine, in combination, a bail including an elongated pivot bar and a pair of links fixed to said pivot bar and extending from spaced portions thereof; support means engaging said links and supporting said bail for turning movement about a stationary axis parallel to said pivot bar; a plurality of digit transferring levers denominationally distributed along said pivot bar and being angularly adjustable thereon; a plurality of elongated reversible members each carried by said support means for movement back and forth along a predetermined path; spring means operatively connected to said reversible members for respectively urging the same in one direction along said path; connecting means respectively connecting said reversible members to said digit transferring levers for angularly adjust- ing the latter about said pivot bar when said bail is stationary and said reversible members move in said one direction and for moving said reversible members respectively along said paths when said levers turn together with said bail about said stationary axis; and releasable locking means carried by said bail for releasably locking said levers respectively in predetermined angular positions on said pivot bar for turning movement together with said bail.

7. In a calculating machine, in combination, a bail including an elongated pivot bar and a pair of links fixed to said pivot bar and extending from spaced portions thereof; support means engaging said links and supporting said bail for turning movement about a stationary axis parallel to said pivot bar; a plurality of digit transferring levers denominationally distributed along said pivot bar and being turnably carried thereby; a plurality of elongated reversible members each carried by said support means for movement back and forth along a predetermined path; connecting means respectively connecting said reversible members to said digit transferring levers for turning the latter about said pivot bar when said bail is stationary and said reversible members move and for moving said reversible members respectively along said paths when said levers turn together with said bail about said stationary axis; spring means operatively connected to said reversible members for respectively urging the same in one direction along said paths; drive means operatively connected to said bail for turning the latter about said axis to move said reversible members through said levers against the force of said spring means when said levers turn together with said bail about said stationary axis; releasable lock means carried by said bail for releasably locking said levers respectively in predetermined angular positions on said pivot bar for turning movement together with said bail; and stop means for limiting the movement of said reversible members by said spring means to positions respectively corresponding to particular digits.

8. In a calculating machine, in combination, a bail including an elongated pivot bar and a pair of links fixed to said pivot bar and extending from spaced portions thereof; support means engaging said links and supporting said bail for turning movement about a stationary axis parallel to said pivot bar; a plurality of digit transferring levers denominationally distributed along said pivot bar and being angularly adjustable thereon; a plurality of elongated reversible members each carried by said support means for movement back and forth along a predetermined path; releasable locking means carried by said bail for releasably locking said levers respectively in predetermined angular positions on said pivot bar for turning movement together with said bail; spring means operatively connected to said reversible members for respectively urging the same in one direction along said path; connecting means respectively connecting said reversible members to said digit transferring levers for angularly adjusting the latter about said pivot bar when said bail is stationary and said reversible members move in said one direction and for moving said reversible members respectively along said path when said levers turn together with said bail about said stationary axis; and drive means operatively connected to said bail for turning the latter about said axis to move said reversible members through said levers against the force of said spring means when said levers turn together with said bail about said stationary axis.

References Cited in the file of this patent

UNITED STATES PATENTS

| | | |
|---|---|---|
| 1,189,288 | Rechnitzer | July 4, 1916 |
| 1,202,867 | Martin | Oct. 31, 1916 |
| 2,100,804 | Heinitz | Nov. 30, 1937 |
| 2,486,328 | Ryan et al. | Oct. 25, 1949 |